United States Patent Office 3,558,215
Patented Jan. 26, 1971

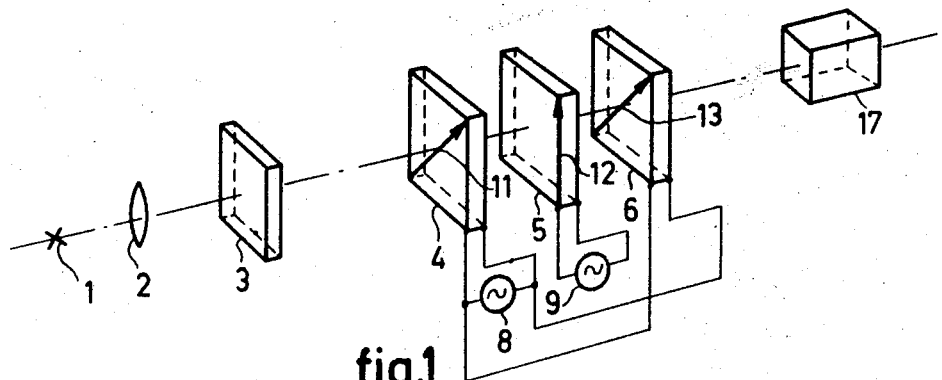
fig. 1
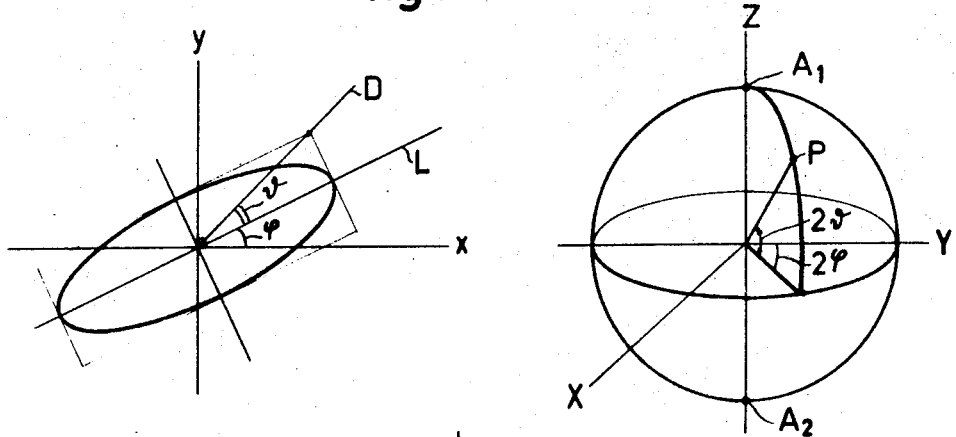
fig. 2a
fig. 2b
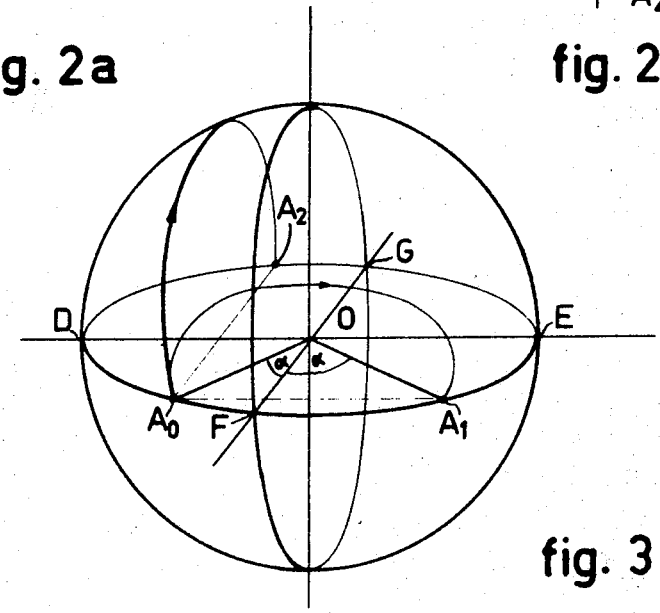
fig. 3a
INVENTORS
HENDRIK DE LANG
PIETER KRAMER
GIJSBERTUS BOUWHUIS
BY
AGENT

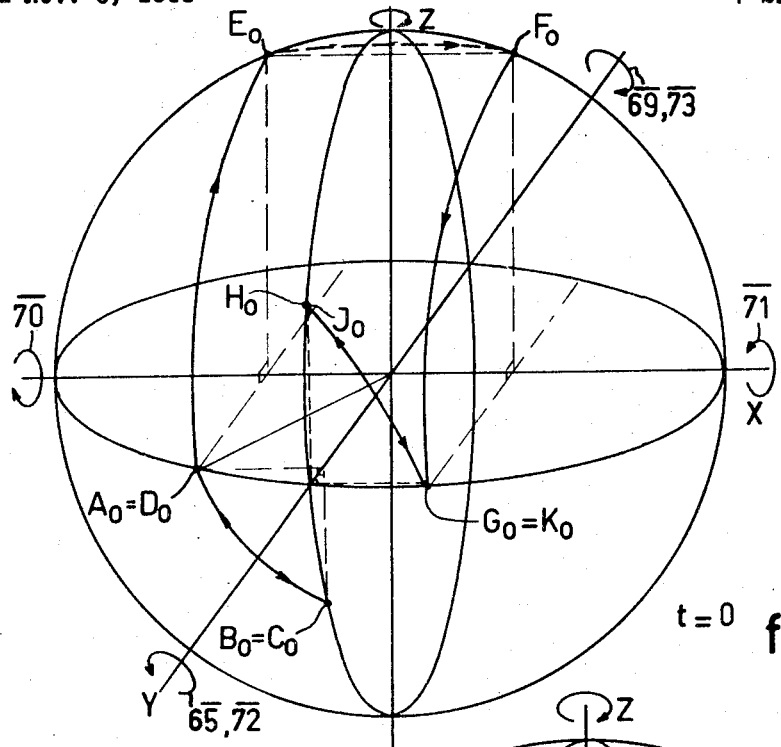
t = 0  fig. 8a
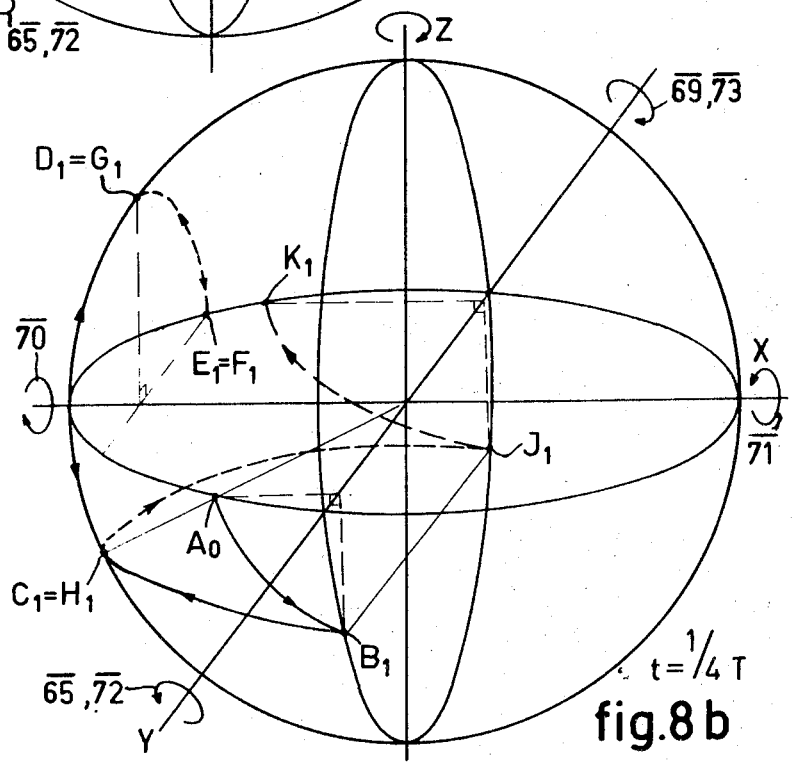
t = ¼ T  fig. 8b

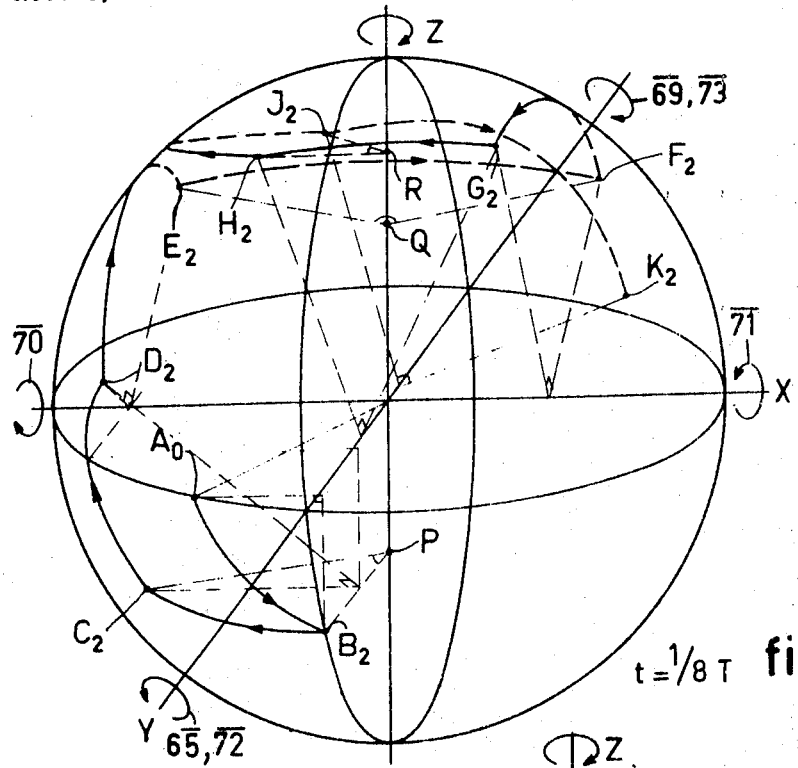
fig.8c  $t = 1/8\ T$
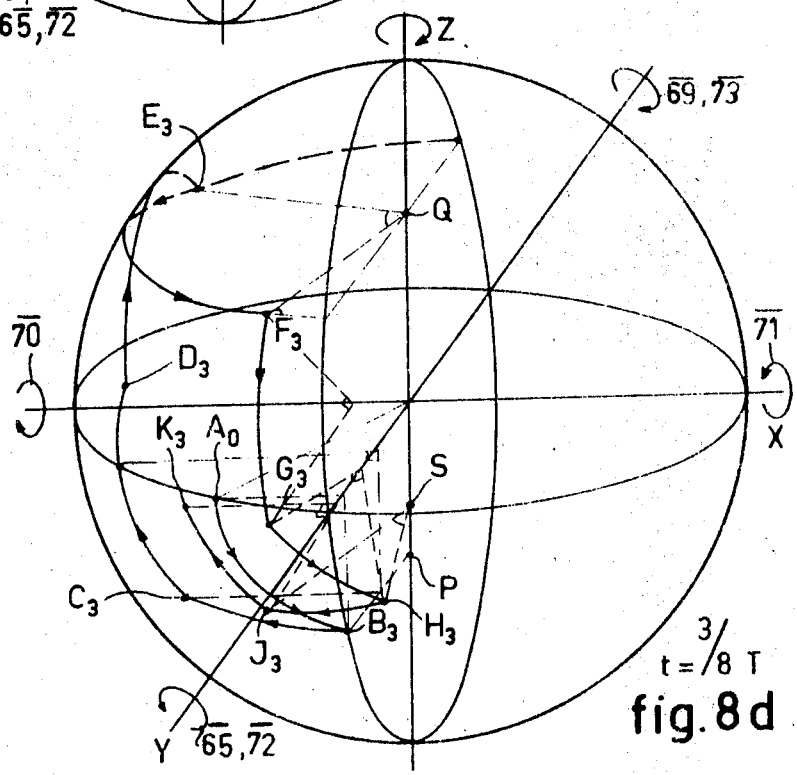
fig.8d  $t = 3/8\ T$

3,558,215
APPARATUS FOR CONVERTING LINEARLY POLARIZED RADIATION WITH A FIXED PLANE OF POLARIZATION INTO LINEARLY POLARIZED RADIATION WITH A ROTATING PLANE OF POLARIZATION
Hendrik de Lang, Delft, and Pieter Kramer and Gijsbertus Bouwhuis, Emmasingel, Eindhoven, Netherlands, assignors to U.S. Philips Corporation, New York, N.Y., a corporation of Delaware
Filed Nov. 8, 1968, Ser. No. 774,349
Claims priority, application Netherlands, Nov. 9, 1967, 6715244
Int. Cl. G02f 1/18
U.S. Cl. 350—150    11 Claims

ABSTRACT OF THE DISCLOSURE

An apparatus for converting a beam of light having an arbitrary plane of polarization into a beam having a slowly rotating plane features at least three serially disposed optical elements. The elements can be either magneto or electro-optical elements. An electro-magnetic field is applied to at least one element. If more than one element has such an applied field, then the fields have a 90 degree phase shift for the adjacent elements.

---

Figure 3B:
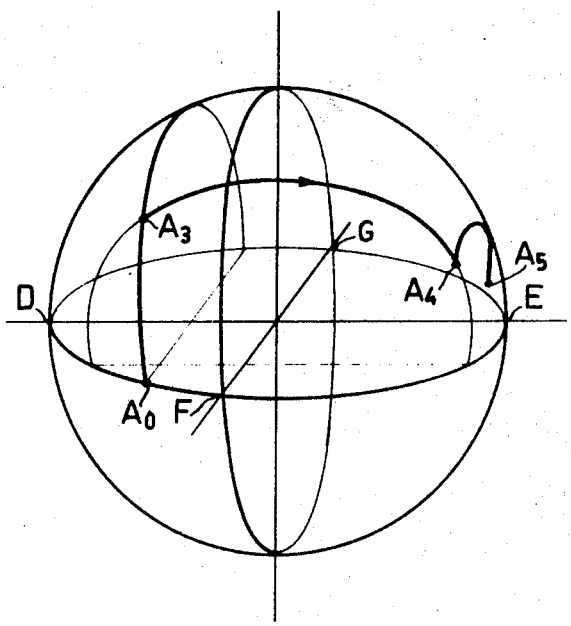

The invention relates to an apparatus for converting linearly polarized radiation having an arbitrary plane of polarization into linearly polarized radiation the plane of polarization of which rotates at a constant or substantially constant angular velocity in a manner such that the orientation of the plane of polarization as a function of time varies linearly from the initial arbitrary orientation.

In a known apparatus of this kind the rotation is obtained by means of a rotating λ/2 plate. The known apparatus has the drawback that the speed of rotation of the λ/2 plate and hence the frequency at which the plane of polarization rotates, is too low for many purposes.

Another known apparatus includes a Kerr cell in which the principal direction of the birefringence rotates by means of an electric rotating field. A Kerr cell is a delicate device.

It is an object of the present invention to provide an apparatus of the above-mentioned kind which avoids the disadvantages of the known apparatus. The invention is characterized in that the apparatus includes a series arrangement of at least three anisotropic elements of which either at least one element is an electro-optical crystal, the relative orientations of the elements and the voltages to be applied to the crystal or crystals being suitably chosen, or at least three elements are magneto-optical crystals the relative orientations of which and the magnetizations in which are suitably chosen.

The electro-optical crystals used preferably are crystals which exhibit the Pockels effect. In these crystals the birefringence is a linear function of the voltage applied to them. An example of such a crystal is a so-called KPD crystal which is very stable and easy to handle. The dielectric properties of a KDP crystal allow the use of high frequencies and high voltages. Consequently, such a crystal can be deeply modulated at a high frequency.

Crystals may also be chosen which have a birefringence which is proportional to the square of the applied voltage. An example of such a crystal is a so-called KTN crystal. When such a crystal has a voltage applied to it which is the sum of a direct voltage and a small alternating voltage the birefringence varies in a substantially linear relationship with the alternating voltage.

As magneto-optical crystals use is made of crystals which exhibit the Faraday effect. In these crystals the rotation of the plane of polarization of the linearly polarized radiation incident on the crystal is a linear function of the magnetizations produced in the crystals. An example of such a crystal is a single crystal of yttrium-iron-garnet (YIG) which is very stable and easy to handle. The dielectric properties of YIG allow the use of comparatively high modulation frequencies of the order of, say, 1 mHz. By means of magnetic fields of reasonable intensity high anisotropies are obtainable. Hence, such a crystal enables rotations of the plane of polarization through large angles and at high frequencies to be obtained.

When polarized radiation passes through the above-mentioned crystals the state of polarization of the transmitted radiation varies with variation in the voltage applied to, or with variation in the magnetization produced in, the crystal.

Figure 4:
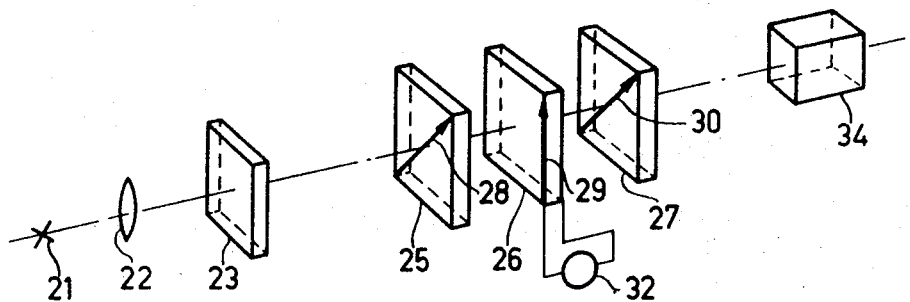
Figure 5:
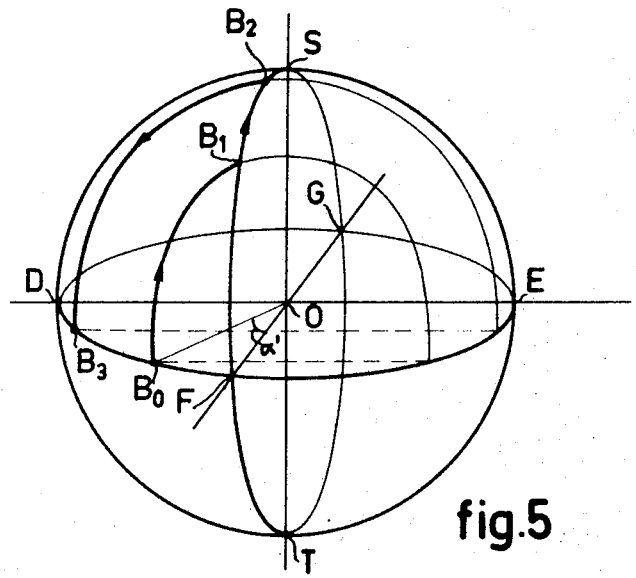
Figure 6:
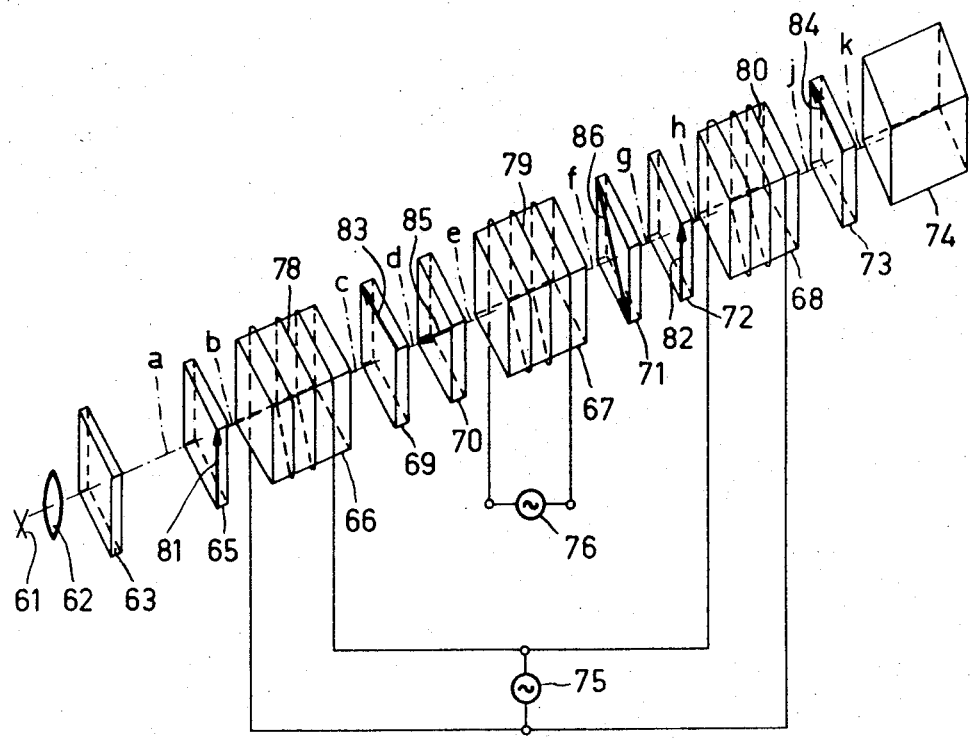
Figure 7:
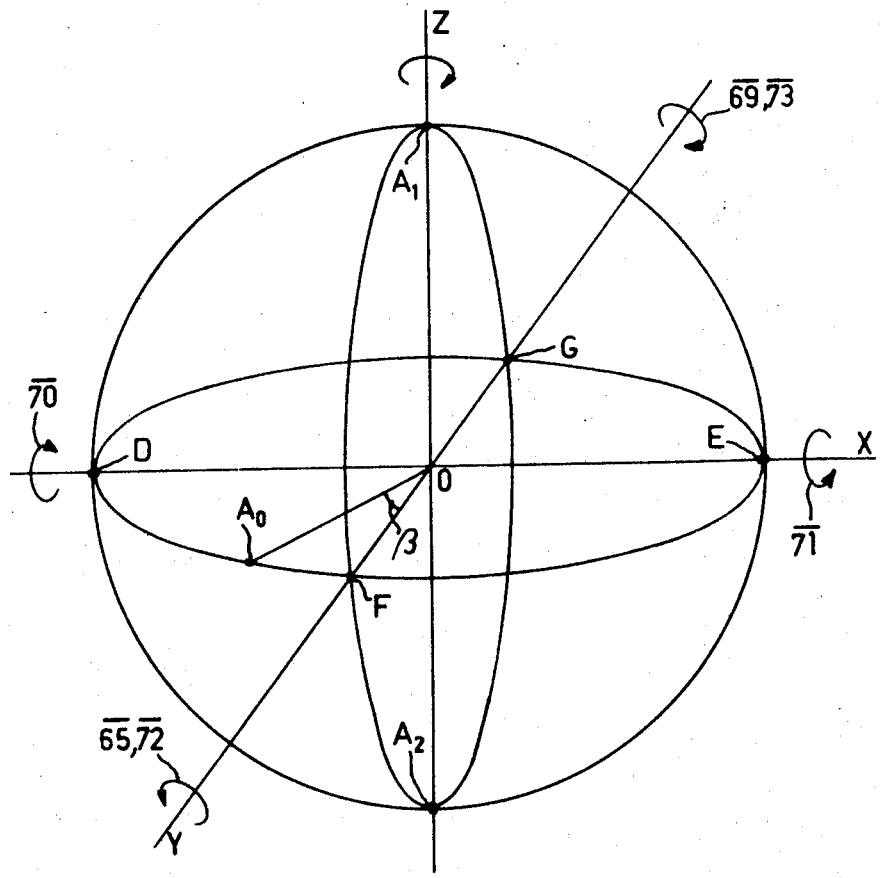

The invention will now be described more fully with reference to the accompanying diagrammatic drawings, in which FIG. 1 is a schematic diagram of a first embodiment of an apparatus according to the invention; FIGS. 2a, 2b, 3a, 3b and 3c are geometrical representations illustrating the operation of the apparatus of FIG. 1; FIG. 4 is a schematic diagram of a second embodiment; FIG. 5 is a geometrical representation illustrating the operation of the apparatus of FIG. 4; FIG. 6 is a schematic diagram of a third embodiment of an apparatus according to the invention, and FIGS. 7 and 8a–8d are geometric representations illustrating the operation of the apparatus of FIG. 6.

In the apparatus shown in FIG. 1 radiation which is emitted by a light source 1 is converted by a lens 2 into a parallel beam which is incident on a polarizer 3. Linearly polarized light emerges from the polarizer 3 and passes through the series combination of three Pockels crystals 4, 5 and 6. The principal directions 11 and 13 of the crystals 4 and 6 are parallel to one another; the principal direction 12 of the crystal 5 is at an angle of 45° to those of the crystals 4 and 6. An alternating voltage $V_1 = V \sin \omega t$ from an alternating-voltage source 8 is applied to the crystals 4 and 6 and an alternating voltage $V_2 = V' \cos \omega t$ from an alternating-voltage source 9 is applied to the crystal 5. The voltages V and V' are applied so that the field strengths produced by them in the crystals 4 and 6 and in 5, respectively, are parallel to the direction of propagation of the light in the respective crystal.

The amplitude V is chosen such that when this voltage is applied to the crystal 4 or 6 linearly polarized light incident on it will be converted into circularly polarized light. This is because V is chosen such as to result in a phase difference of a quarter wavelength between the two vibrations produced from the linearly polarized light in its passage through the respective crystal.

The voltage V' is chosen such that when this voltage is applied to the crystal 5 there will be a phase difference of a half wavelength between the two vibrations produced from linearly polarized light in its passage through this crystal, in other words linearly polarized light again emerges from the crystal 5.

The orientation of the plane of polarization of the emerging light can be readily calculated for five instants. For these five instants, viz. for $t=0$, $t=T/8$, $t=T/4$, $t=3T/8$ and $t=T/2$, the orientation of the plane of polarization has been rotated substantially in direct proportion to the time $t$. For intermediate instants there are deviations from this direct proportionality. The speed of rotation of the plane of polarization is not wholly constant. Moreover, the light emerging from the series arrangement of the crystals is polarized slightly elliptically for these intermediate instants. The approximations to the time linearity of the rotation and to the linearity of the polarized light may be improved either by a suitable choice of the voltages V and V' or by the use of more crystals which are suitably excited. In the latter case the odd and even numbered crystals together must exhibit an anisotropy of about $\lambda/2$ at the instants $t=0$ and $t=T/4$.

By means of the Poincaré sphere, cf. also "Principles of Optics" by Born and Wolf (pages 30 and 31), which represents all the different states of polarization, the above calculation can be illustrated.

A state of polarization P is characterized by an ellipse in the $xy$ plane (FIG. 2a) the major axis L of which makes an angle $\varphi$ with the $x$ axis and an angle $\vartheta$ with the diagonal D of the circumscribed rectangle. The ellipticity of the ellipse is given by tan $\vartheta$.

On the Poincaré sphere (FIG. 2b) the point P is characterized by the angles $2\varphi$ and $2\vartheta$. There is an unambiguous relationship between the state of polarization and the associated point on the sphere.

The angle $\vartheta=0°$ (linearly polarized light, see FIG. 2a) corresponds to points on the equator of the sphere, i.e. the equator represents all the linear states.

The angle $\vartheta=45°$ (circularly polarized light) corresponds to the poles ($A_1$ and $A_2$) of the sphere.

Linear phase anisotropy as found in birefringent crystals may be represented as a rotation about a horizontal axis in the equatorial plane. Particularly, in $\lambda/4$ plates the rotation is 90°.

On the Poincaré sphere (FIG. 3a) the line FG represents the principal direction of the crystal 5 and the line ED the principal direction of the crystals 4 and 6.

The initial orientation of the plane of polarization of the linearly polarized beam incident upon the crystal 4 is arbitrary. The line $A_0O$ which makes an angle $\alpha$ with the axis FG represents this arbitrary orientation.

At the instant $t=0$ only the crystal 5 is active. The state of polarization of the radiation emerging from the crystal 5 is found by rotating $A_0$ through 180° about the axis FG. The point $A_1$ on the equator represents the state of polarization of the polarized radiation emerging from the crystal 6.

At the instant $t=T/4$ only crystals 4 and 6 are active. The state of polarization of the emerging radiation is found by rotation through 180° about the axis DE. The point $A_2$ on the equator represents the state of polarization of the linearly polarized radiation emerging from the crystal 6.

At the instant $t=T/8$, $V_1=V$ sin $\omega t = V$ sin $2\pi/T$, $T/8=0.7V$ and $V_2=V'$ cos $\omega t=0.7V'$.

The state of polarization of the radiation emerging from the crystal 4 is found by rotating $A_0$ through $0.7 \cdot 90°=63°$ about the axis DE (FIG. 3b). This gives the point $A_3$. The state of polarization of the radiation emerging from the crystal 5 is found by rotation about the axis FG through $2 \cdot 0.7 \cdot 90=126°$. This rotation is shown by the arc $A_3A_4$. Finally the radiation passes through the crystal 6. The state of polarisation of the radiation emerging from the crystal 6 is found by rotation about the axis DE through 63°. This gives the point $A_5$ near the equator. This means that the emerging light is polarized substantially linearly. The azimuth of the state of polarization represented by the point $A_5$ lies approximately midway between that for $A_1(t=0)$ and for $A_2(t=T/4)$.

At the instant $t=3T/8 V_1=V$ sin $\omega t=V$ sin $2\pi/T$ $3T/8=0.7V$ and $V_2=V'$ cos $\omega t=-0.7V'$.

Figure 3C:
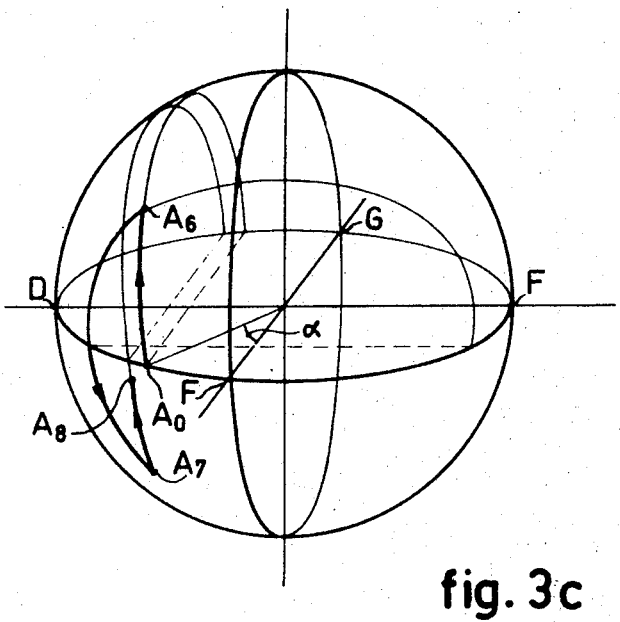

FIG. 3c shows the points which represent the states of polarization after passage through the crystal 4 (point $A_6$), after passage through the crystal 5 (point $A_7$; is found by rotation about the axis DE through $-127°$.) and after passage through the crystal 6 (point $A_8$), respectively. The point $A_8$ lies near the equator. Again, the emerging light is polarized substantially linearly. The point $A_8$ is substantially equidistant from the points $A_1(t=T/2)$ and $A_2(t=T/4)$ (cf. FIG. 3a).

In the apparatus shown in FIG. 4 the radiation emitted by a light sourse 21 and converted into a parallel beam by a lens 22 is incident on a polariser 23. From the polariser 23 there emerges linearly polarized light which passes through a series arrangement comprising in sequence a $\lambda/4$ plate 25, a Pockels crystal 26 and a $\lambda/4$ plate 27. The principal directions 28 and 30 of the $\lambda/4$ plates 25 and 27 are parallel, the principal direction 29 of the crystal 26 is at an angle of 45° to that of the plates 25 and 27.

To the crystal 26 is applied a sawtooth voltage from a source 32, the difference between the maximum and minimum values of the voltage being chosen such that a phase difference of unit wavelength is produced between the two vibrations produced from linearly polarized light traversing the crystal 26.

On the Poincaré sphere (FIG. 5) the line FG represents the principal direction of the $\lambda/4$ plates 25 and 27 and the line ED represents the principal direction of the crystal 26.

The initial orientation of the polarization plane of the radiation incident upon the $\lambda/4$ plate 25 is arbitrary. A line $B_0O$ at an angle $\alpha'$ to the axis FG represents the arbitrary orientation.

For each arbitrary instant $t$, for polarized radiation incident upon the $\lambda/4$ plate 25 the change in polarization state produced by this plate is represented by a rotation about the axis FG through 90°. Point $B_1$ on circle TFSG represents the state of polarization of the radiation emerging from the $\lambda/4$ plate 25.

In the crystal 26 the state of polarization of the incident radiation is changed in accordance with the instantaneous voltage applied to the crystal. Point $B_2$ on the circle TFSG reached by rotation about the axis DE represents the polarization state of the radiation emerging from the crystal 26. The $\lambda/4$ plate 27 changes the polarization state of the incident radiation. This change is represented by a rotation through 90° about the axis FG. Point $B_3$ on the equator represents the plane of polarization of the linearly polarized radiation which emerges from the $\lambda/4$ plate 27 and falls on the detector 34.

Point $B_3$ travels at constant speed along the equator FEGD when the voltage applied to the crystal 26 rises from its minimum to its maximum value.

The linearly polarized light emerging from the series arrangement falls on the detector 7 (FIG. 1) or 34 (FIG. 4) respectively. The detector may comprise an analyser succeeded by a photocell.

In the apparatus shown in FIG. 6 radiation emitted by a source of light 61 and converted into a parallel beam by a lens 62 falls on a polariser 63. The light emerging from the polariser 63 is linearly polarized.

The linearly polarized light then traverses the series arrangement of a $\lambda/4$ plate 65, a magneto-optical crystal 66, a $\lambda/4$ plate 69, a $\lambda/4$ plate 70, a magneto-optical crystal 67, a $\lambda/4$ plate 71, a $\lambda/4$ plate 72, a magneto-optical crystal 68 and a $\lambda/4$ plate 73. The principal direction of the plate 65, which is indicated by an arrow 81, is equal to the principal direction of the plate 72 indicated by an arrow 82. The principal direction of the plate 69, which is indicated by an arrow 83, is equal to the principal direction of the plate 73 indicated by an arrow 84 and makes an angle of 90° with the principal direction of the plates 65 and 72. The principal direction of the plate 70, which is indicated by an arrow 85, makes an angle of 90° with the principal direction of the plate 71 indicated by an arrow 86. The principal direction of the plates 69 and 70 and that of the plates 71 and 72 make angles of 45° with one another.

The crystals 66, 67 and 68 are magnetized in a direction parallel or substantially parallel to the direction of propagation of the radiation in the relevant crystal. An alternating voltage source 75 produces a magnetization $B_1=\frac{1}{2}B_0$ sin $\omega t$ in the crystal 66 by means of a coil 78 and in the crystal 68 by means of a coil 80. An alternating current source 76 produces a magnetization $B_2=B_0$ cos $\omega t$ in the crystal 67 by means of a coil 79. The amplitudes $B_0$ and ½ $B_0$ are arranged to be such that at this value of the field the plane of polarization of incident linearly polarized light is rotated through 90° in the crystal 67 and through 45° in the crystal 66 or 68.

In one embodiment in which the crystals 66, 67 and 68 were YIG single crystals they were 4 cm. long. The applied magnetic field had an amplitude of 1 oersted. The permeability of the crystals was 200, so that $B_0$ was equal to 200 gauss.

The orientation of the plane of polarization of the light beam which emerges from the series arrangement and falls on a detector 74 can be determined for five instants.

It is found that for these five instants, namely $t=0$, $t=T/8$, $t=T/4$, $t=3T/8$ and $t=T/2$, the orientation of the plane of polarization has been rotated substantially in proportion to the time $t$. For intermediate instants there are deviations from direct proportionality. The angular velocity of the plane of polarization is not fully constant. In addition, the light emerging from the series arrangement of the crystals is slightly elliptically polarized for the intermediate instants. The approximations to time linearity of the rotation and to the linearity of the polarized light may be improved either by a suitable choice of the ratio between the amplitudes of $B_1$ and $B_2$ or by using a greater number of suitably magnetized crystals.

With the aid of the Poincaré sphere (FIG. 2$b$) the above determination may again be represented. For magneto-optical crystals the rotation of the plane of polarization through an angle $\alpha$ may be represented as a rotation through $2\alpha$ about the axis passing through the poles $A_1$ and $A_2$.

On the Poincaré sphere (see FIG. 7) the line FG represents the principal direction of the $\lambda/4$ plates 65, 72, 79 and 73 and the line DE the principal direction of the $\lambda/4$ plates 70 and 71. For an observer looking at this figure the sense of rotation of the polarization state on the sphere is assumed to be counter-clockwise. The sense of rotation of the polarization state of light traversing the $\lambda/4$ plates 65 and 72 is indicated by $\overline{65}$ and $\overline{72}$, and that of the polarization state of light traversing the $\lambda/4$ plates 70 and 71 by $\overline{69}$ and $\overline{73}$. The initial orientation of the polarization plane of the linearly polarized beam incident upon the $\lambda/4$ plate 65 is arbitrary. A line $A_0O$ which makes an angle $\beta$ with the axis FG represents this arbitrary orientation.

The states of polarization of the radiation at points $a, b, c, \ldots k$ are shown on the Poincaré sphere for the five instants $t=0$, $t=T/8$, $t=T/4$, $t=3T/8$ and $t=T/2$. Obviously, for each of these five instants passage of the light through each of the $\lambda/4$ plates produces the same rotation about the sphere axis associated with each individual plate. The rotation about the Z axis, which represents the change in the state of polarization of the light after its passage through a magneto-optical crystal, depends upon the value of the magnetic field produced in the crystal at the instant chosen.

FIG. 8$a$ shows the situation at the instant $t=0$ of a beam which at the point $a$ (FIG. 6) has an arbitrary plane of polarization indicated by the point $A_0$. In the figure, points $B_0, C_0, \ldots, K_0$ correspond to the state of polarization at points $b, c, \ldots k$, respectively. In FIG. 8$b$, which shows the situation at the instant $t=T/4$, analogous points are designated by $B_1, C_1, \ldots, K_1$. In FIG. 8$c$ ($t=T/8$) the points are designated by $B_2, C_2, \ldots K_2$, and in FIG. 8$d$ ($t=3T/8$) by $B_3, C_3, \ldots, K_3$.

At the instant $t=0$, the magnetization $B_1=0$ and $B_2=B_0$. In the magneto-optical crystals 66 and 68 no rotation takes place; in the crystal 67 the plane of polarization is rotated through 90° and this is represented on the sphere (FIG. 8$a$) as a rotation through 180° about the Z axis (from the point $E_0$ to the point $F_0$).

For $t=T/4$, $B_1=\frac{1}{2}B_0$ and $B_2=0$. In the crystal 67 no rotation takes place, but in the crystals 66 and 68 the plane of polarization is rotated through 45°, and this is represented on the sphere (FIG. 8$b$) as a rotation through 90° about the Z axis from $B_1$ to $C_1$ and from $H_1$ to $J_1$.

For $t=T/8$, $B_1=1/4\sqrt{2B_0}$ and $B_2=½\sqrt{2B_0}$. The plane of polarization is rotated through $½\sqrt{2}.90°=63°$ in the crystal 67 and through $¼\sqrt{2}.90°=31.5°$ in each of the crystals 66 and 68, which is represented on the sphere (FIG. 8$c$) by rotations about the Z axis through 126° from $E_2$ to $F_2$ and through 63° from $B_2$ to $C_2$ and from $H_2$ to $J_2$. Thus, the angles $C_2PB_2$ and $H_2RJ_2$ are 63° and the angle $E_2QF_2$ is 126°.

For $t=3T/8$, $B_1=¼\sqrt{2B_0}$ and $B_2=-½\sqrt{2B_0}$. The plane of polarization is rotated through $$-½\sqrt{2}.90°=-63°$$

in the crystal 67 and through $¼\sqrt{2}.90°=31.5°$ in each of the crystals 66 and 68, and this is represented on the sphere (FIG. 8$d$) by rotations about the Z axis through −126° (from $E_3$ to $F_3$) and through 63° (from $B_3$ to $C_3$ and from $H_3$ to $J_3$).

For $t=T/2$ the situation on the sphere is the same as that for $t=0$, however, the clockwise rotation through 180° from $E_0$ to $F_0$ will be a counterclockwise rotation.

As will be seen, the points $K_0$, $K_1$, $K_2$ and $K_3$ lie exactly or approximately on the equator so as to be spaced apart by distances of about ¼ of the circumference of the equation. This means that for the said five instants the plane of polarization of the light incident on the detector 74 has been rotated substantially in direct proportion to the time $t$.

What is claimed is:

1. An optical device for controlling a beam of linearly polarized light having an arbitrary plane of polarization comprising means for converting the linearly polarized light beam into a linearly polarized light beam having a plane of polarization rotating at a substantially constant speed including at least first, second, and third anisotropic elements serially arranged with respect to the light beam and each of said elements having a selected principal direction in a predetermined direction with respect to the other elements, said elements having a variable anisotropy with the application of an electromagnetic field, and means for applying an electromagnetic field to said at least one of said elements.

2. A device as claimed in claim 1 wherein said elements comprise electro-optical crystals and said first and third crystal principal directions being parallel with respect to one another and at an angle of 45 degrees with respect to said second crystal principal direction.

3. A device as claimed in claim 2 wherein said serial arrangement of crystals comprises $2n+1$ number of crystals, wherein $n$ equals an integer, and said principal directions of said even and odd numbered crystals are at an angle of 45 degrees with respect to each other.

4. A device as claimed in claim 3 wherein said electromagnetic field comprises an electrical field applied to all of said elements, said field applied to the odd numbered crystals being 90 degrees out of phase with respect to said field applied to said even numbered crystals.

5. A device as claimed in claim 2 wherein said electromagnetic field applied to all of said elements comprises an electric field, said field causing a phase shift of one quarter wavelength in said first and third crystals and one half wavelength in said second crystal.

6. A device as claimed in claim 1 wherein said second element comprises an electro-optical crystal, said first and third elements comprise one quarter wavelength plates, and said applying means applies a sawtooth electric field having maximum and minimum values corresponding to one wavelength to said second crystal.

7. A device as claimed in claim 1 wherein each of said elements comprises a plurality of sub-elements, and wherein the value of the electromagnetic field applied to a sub-element is equal to the value applied to an element divided by the number of sub-elements.

8. A device as claimed in claim 1 wherein said elements comprise an odd number of magneto-optical crystals.

9. A device as claimed in claim 1 wherein said elements comprise magneto-optical crystals, said electromagnetic field comprises a magnetic field, and further comprising a number of one quarter wavelength plates disposed to both precede and succeed each of said elements, said preceding plates having principal directions equal to 90 degrees from the principal directions and the corresponding succeeding plates, the principal directions of the quarter wavelength plates preceding and succeeding the middle crystal making angles of 45 degrees with the principal directions of the quarter wavelength plates preceding and succeeding the outer crystals.

10. A device as claimed in claim 9 wherein said magnetic field is applied to all of said elements, the field in said even numbered crystals being 90 degrees out of phase with respect to the field in said odd numbered crystals.

11. A device as claimed in claim 10 wherein said magnetic fields in said even and odd numbered crystals produce a 180 degree phase rotation of the polarization of said light beam.

References Cited
UNITED STATES PATENTS

| | | | |
|---|---|---|---|
| 3,239,671 | 3/1966 | Buhrer | 350—150X |
| 3,272,988 | 9/1966 | Bloom et al. | 350—151X |

DAVID SHONBERG, Primary Examiner

P. R. MILLER, Assistant Examiner

U.S. Cl. X.R.

350—151, 157